(12) United States Patent
Hayashi et al.

(10) Patent No.: US 11,404,979 B2
(45) Date of Patent: Aug. 2, 2022

(54) MOTOR DRIVING CIRCUIT, INTEGRATED CIRCUIT DEVICE, AND ELECTRONIC APPARATUS

(71) Applicant: SEIKO EPSON CORPORATION, Tokyo (JP)

(72) Inventors: Haruo Hayashi, Shiojiri (JP); Motoaki Nishimura, Chino (JP); Makoto Katase, Azumino (JP); Yusuke Sano, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/083,744

(22) Filed: Oct. 29, 2020

(65) Prior Publication Data

US 2021/0135607 A1 May 6, 2021

(30) Foreign Application Priority Data

Oct. 31, 2019 (JP) .............................. JP2019-198386

(51) Int. Cl.
*H02P 5/68* (2006.01)

(52) U.S. Cl.
CPC ..................................... *H02P 5/68* (2013.01)

(58) Field of Classification Search
CPC ...... H02P 1/00; H02P 1/04; H02P 1/16; H02P 1/163; H02P 1/18; H02P 1/24; H02P 1/26; H02P 1/46; H02P 6/00; H02P 1/54; H02P 2006/045; H02P 7/00; H02P 7/025; H02P 7/03; H02P 7/04; H02P 7/14; H02P 7/281; H02P 7/29; H02P 8/00; H02P 8/02; H02P 8/04; H02P 8/12; H02P 8/40; H02P 21/22; H02P 23/00; H02P 25/034; H02P 25/066; H02P 27/00; H02P 27/08

See application file for complete search history.

(56) References Cited

U.S. PATENT DOCUMENTS

| | | | | |
|---|---|---|---|---|
| 6,590,633 B1 * | 7/2003 | Nishi | ................. | G03F 7/70358 269/21 |
| 7,150,572 B2 * | 12/2006 | McNestry | ................ | B41J 2/325 400/223 |
| 7,834,567 B2 * | 11/2010 | Naya | ........................ | H02P 6/16 318/400.03 |
| 8,783,816 B2 * | 7/2014 | Masuda | ............... | B41J 2/04541 347/17 |
| 9,724,933 B2 * | 8/2017 | McNestry | ................ | B41J 35/36 |
| 2019/0067267 A1 | 2/2019 | Shishikura | | |

FOREIGN PATENT DOCUMENTS

| | | | | |
|---|---|---|---|---|
| EP | 2744665 B1 * | 7/2018 | ............. | B41J 33/14 |
| JP | 2019-047104 | 3/2019 | | |

* cited by examiner

Primary Examiner — Antony M Paul
(74) Attorney, Agent, or Firm — Rankin, Hill & Clark LLP (57) ABSTRACT

A motor driving circuit includes a first motor driving circuit that controls driving of a first motor is disposed, a second motor driving circuit that controls driving of a second motor is disposed, and a constant current generation circuit that generates a constant current is disposed, and the constant current generation circuit is disposed at a position deviating from between the first motor driving circuit and the second motor driving circuit.

8 Claims, 6 Drawing Sheets

MOTOR DRIVING CIRCUIT, INTEGRATED CIRCUIT DEVICE, AND ELECTRONIC APPARATUS

The present application is based on, and claims priority from JP Application Serial Number 2019-198386, filed Oct. 31, 2019, the disclosure of which is hereby incorporated by reference herein in its entirety.

BACKGROUND

1. Technical Field

The present disclosure relates to a motor driving circuit, an integrated circuit device, and an electronic apparatus.

2. Related Art

For example, an integrated circuit device disclosed in Patent Document 1 includes a motor driving circuit and a control circuit, the motor driving circuit being disposed on one edge of a chip, and the control circuit being disposed on another edge of the chip. Influence that noise generated from the motor driving circuit has on other circuits is reduced by disposing the motor driving circuit on one edge of the chip in this manner.

JP A-2019-47104 is an example of the related art.

However, in JP A-2019-47104, there is no mention whatsoever of a configuration in which a motor driving circuit and an analog circuit are disposed on a chip. Therefore, depending on the arrangement of these circuits, there is a risk that noise generated from the motor driving circuit affects the analog circuit, and causes the analog circuit to malfunction.

SUMMARY

A motor driving circuit according to the present invention includes:
- a first motor driving circuit block in which a first motor driving circuit that controls driving of a first motor is disposed;
- a second motor driving circuit block in which a second motor driving circuit that controls driving of a second motor is disposed; and
- a constant current generation circuit block in which a constant current generation circuit that generates a constant current is disposed, and
- the constant current generation circuit block is disposed at a position deviating from between the first motor driving circuit block and the second motor driving circuit block.

BRIEF DESCRIPTION OF THE DRAWINGS

The disclosure will be described with reference to the accompanying drawings, wherein like numbers reference like elements.

DESCRIPTION OF EXEMPLARY EMBODIMENTS

Hereinafter, a motor driving circuit, an integrated circuit device, and an electronic apparatus according to the present disclosure will be described in detail based on embodiments illustrated in the attached drawings.

First Embodiment

Figure 1:
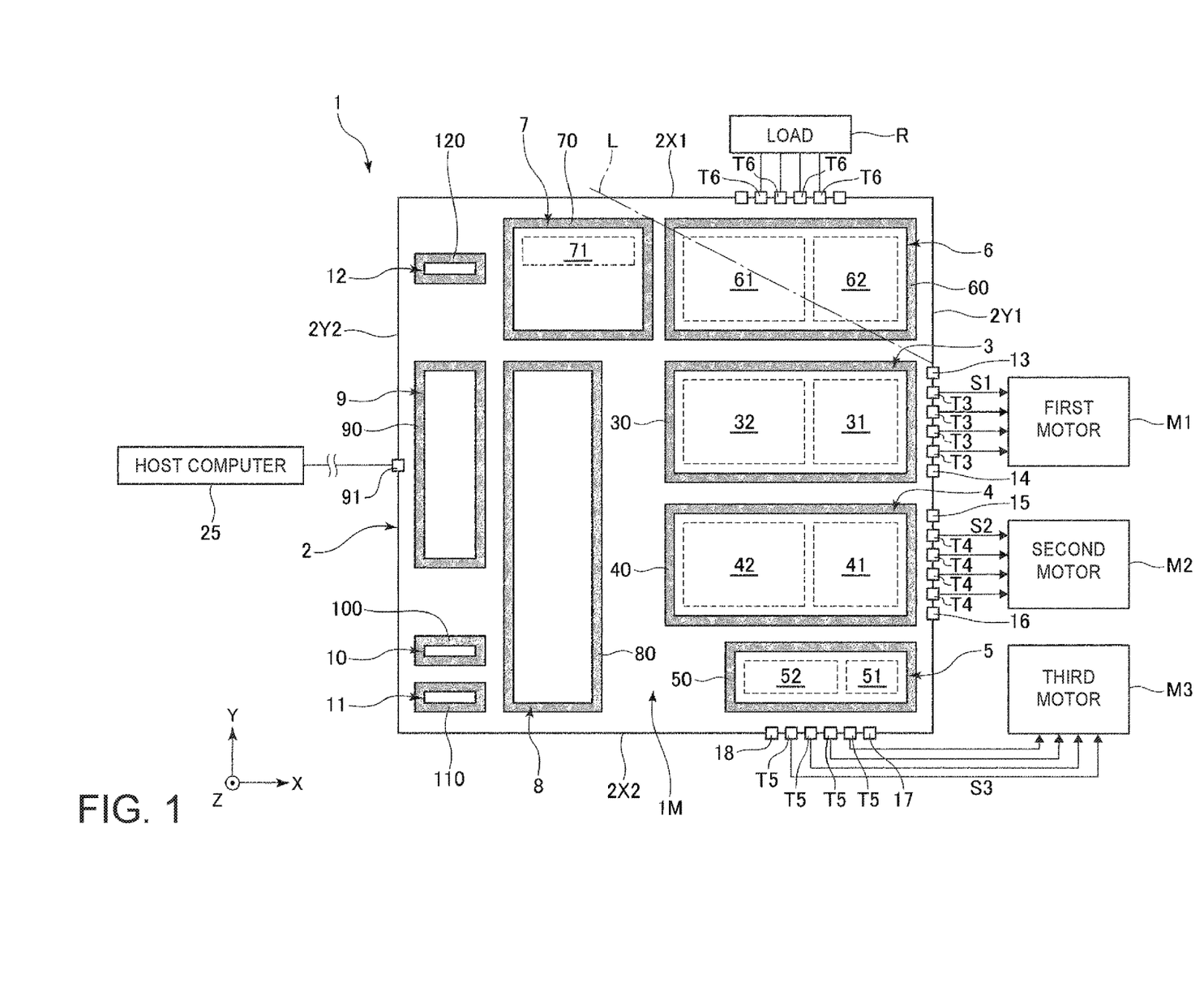
FIG. 1 is a diagram showing a circuit configuration of an integrated circuit device according to a first embodiment.
Figure 2:
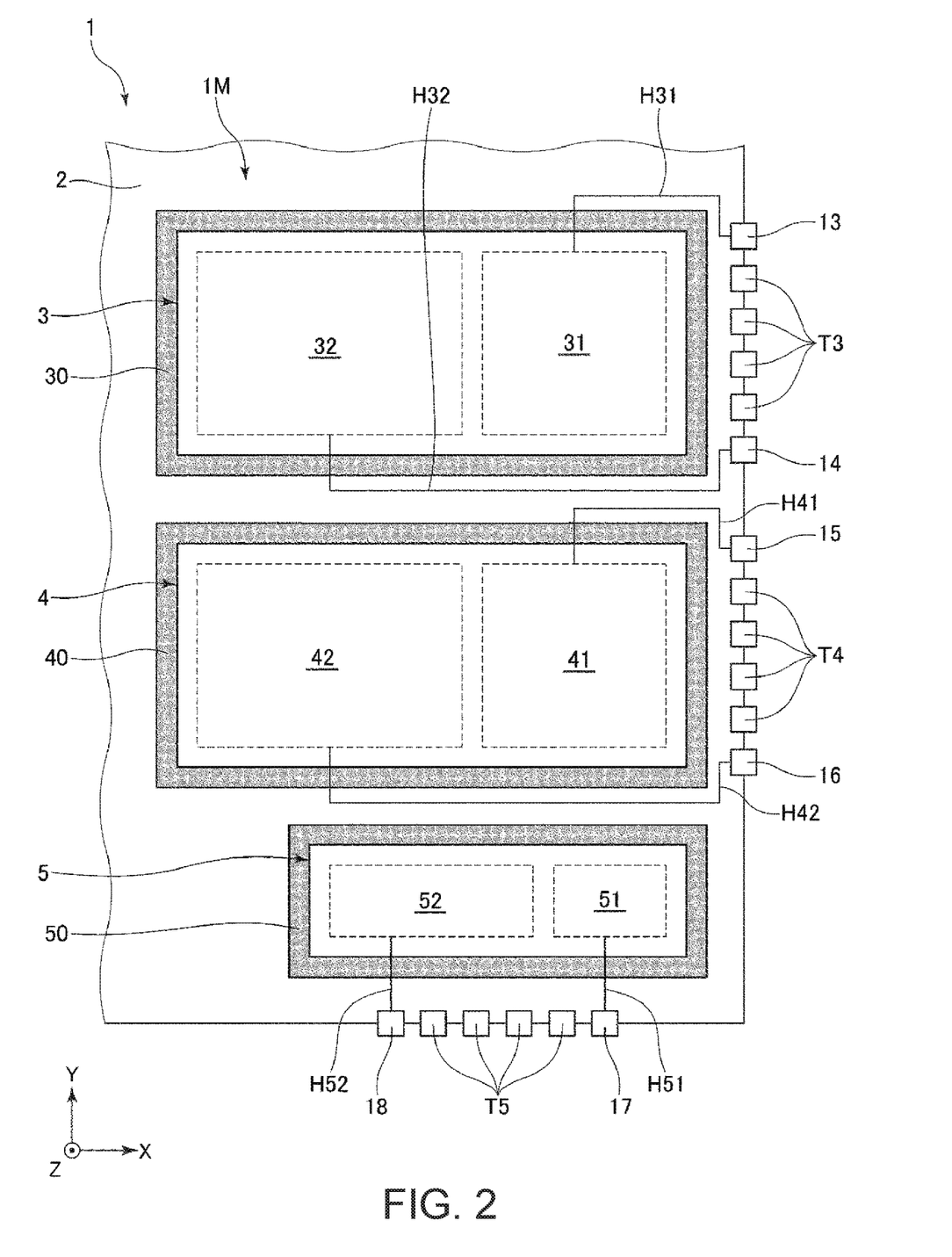
FIG. 2 is a partial enlarged view of the integrated circuit device shown in FIG. 1.
Figure 3:
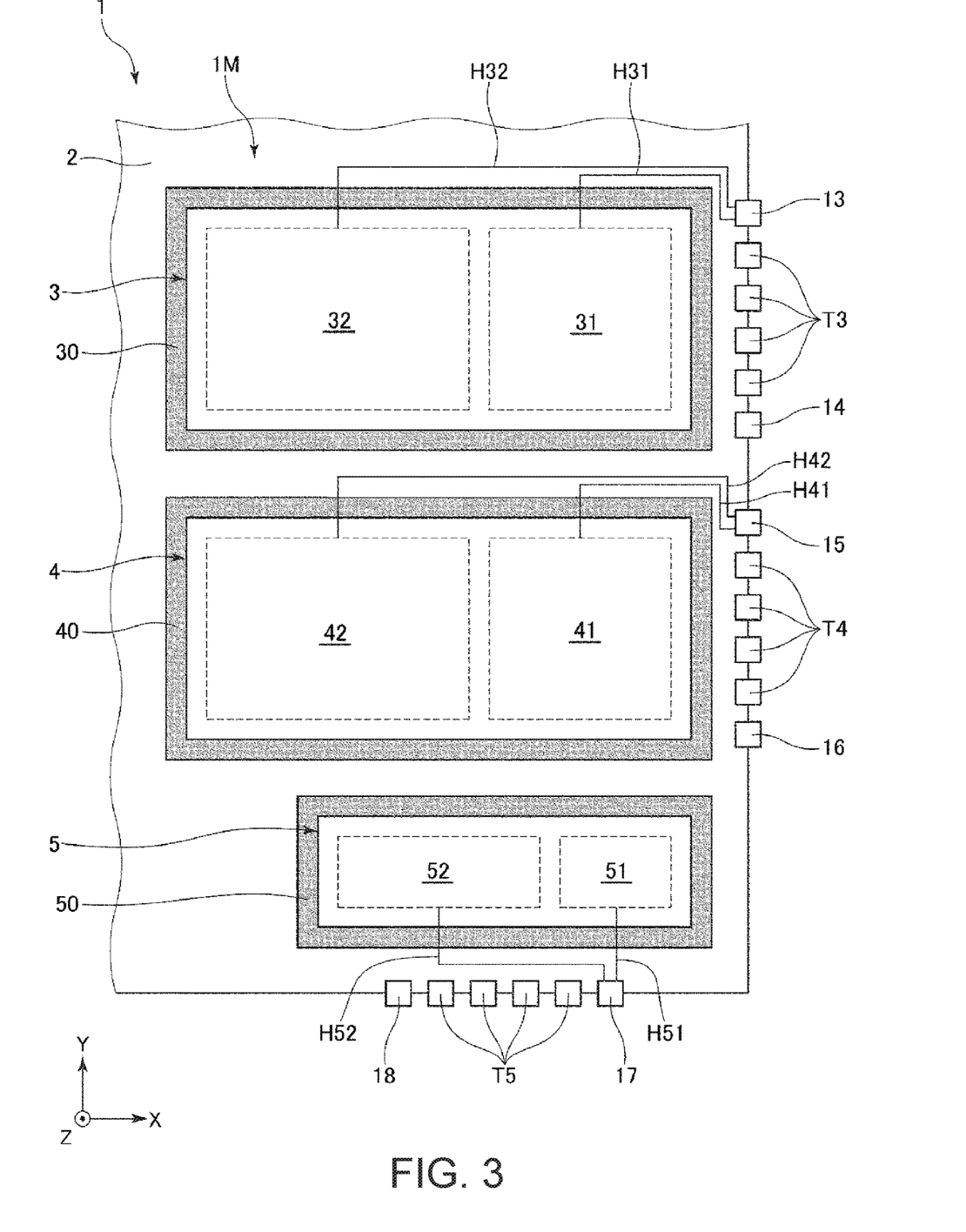
FIG. 3 is a partial enlarged view of the integrated circuit device shown in FIG. 1.

FIG. 1 is a diagram showing a circuit configuration of an integrated circuit device according to a first embodiment. FIGS. 2 and 3 are partial enlarged views of the integrated circuit device shown in FIG. 1. Note that, for convenience of description, FIGS. 1 to 3 show three axes orthogonal to each other, namely an X axis, a Y axis, and a Z axis. In addition, hereinafter, the front-edge side of the arrow of each axis is also referred to as a "plus side", and the opposite side is also referred to as a "minus side".

An integrated circuit device 1 shown in FIG. 1 is configured such that an IC chip in which a motor driving circuit 1M is formed on a silicon substrate 2, which is a semiconductor substrate, is housed in a package (not illustrated). The shape of the silicon substrate 2 when seen in a planar view from the Z axis direction is rectangular, and includes sides 2X1 and 2X2 that extend in the X axis direction and sides 2Y1 and 2Y2 that extend in the Y axis direction. Note that the shape of the silicon substrate 2 is not limited to a rectangle, and examples of the shape may include a triangle, a quadrangle other than a rectangle, a polygon with five or more sides, a circle, and an irregular form. In addition, a semiconductor substrate other than a silicon substrate, such as a Ge substrate or a SiGe substrate may also be used.

The motor driving circuit 1M includes a first motor driving circuit 3, a second motor driving circuit 4, a third motor driving circuit 5, a constant current generation circuit 6, a DC/DC converter circuit 7, a logic circuit 8 that is a control circuit, an interface circuit 9, a reset circuit 10, a reference voltage circuit 11, and an oscillation circuit 12. These circuits 3 to 12 are formed on the silicon substrate 2 to be gathered in different regions (blocks). Note that the circuits 3 to 12 are each configured by an impurity region or a well formed in the silicon substrate 2, or a gate insulation film, a gate, an interconnect, or the like formed in an upper portion of the silicon substrate 2, and this is expressed as "formed on the silicon substrate 2".

Note that, hereinafter, a region in which the first motor driving circuit 3 is disposed is also referred to as a "first motor driving circuit block 30", a region in which the second motor driving circuit 4 is disposed is also referred to as a "second motor driving circuit block 40", a region in which the third motor driving circuit 5 is disposed is also referred to as a "third motor driving circuit block 50", a region in which the constant current generation circuit 6 is disposed is also referred to as a "constant current generation circuit block 60", a region in which the DC/DC converter circuit 7 is disposed is also referred to as a "DC/DC converter circuit block 70", a region in which the logic circuit 8 is disposed is also referred to a "logic circuit block 80", a region in which the interface circuit 9 is disposed is also referred to as an "interface circuit block 90", a region in which the reset circuit 10 is disposed is also referred to as a "reset circuit block 100", a region in which the reference voltage circuit 11 is disposed is also referred to as a "reference voltage circuit block 110", and a region in which the oscillation circuit 12 is disposed is also referred to as an "oscillation circuit block 120".

The logic circuit 8 is a circuit that includes logic cells such as NAND, NOR, an inverter, and a D flip flop, and performs logical operations and storing operations. The logic circuit 8 can be realized by a gate array, a microcomputer, or the like, and performs various types of sequence control and determination processing. Also, the logic circuit 8 performs overall control of the integrated circuit device 1. In addition, the interface circuit 9 is a circuit that includes an input-output port 91, for example, and communicates with a host computer 25, for example. In addition, the reset circuit 10 is a circuit that initializes each circuit, and, specifically in the present embodiment, is constituted by a power-on reset (POR) circuit. Also, the reference voltage circuit 11 is a circuit that generates a reference voltage to be used in the circuits, for example. Also, the oscillation circuit 12 is a circuit that generates a clock signal having a predetermined frequency.

Note that, among these circuits 8 to 12, the reset circuit 10 and the reference voltage circuit 11 are each constituted by an analog circuit, and the logic circuit 8, the interface circuit 9, and the oscillation circuit 12 are each constituted by a digital circuit. In other words, the reset circuit 10 and the reference voltage circuit 11 include an analog circuit, and the logic circuit 8, the interface circuit 9, and the oscillation circuit 12 do not include an analog circuit.

The DC/DC converter circuit 7 generates a power supply voltage to be supplied to the circuit by stepping down an input voltage that is input from the outside. The DC/DC converter circuit 7 is a current-mode-control switching regulator, for example, and includes an analog circuit 71 that includes a switching element such as comparator. Note that configuration of the DC/DC converter circuit 7 is not specifically limited as long as a power supply voltage can be generated from the input voltage.

The first motor driving circuit 3 is a circuit that controls driving of a first motor M1 that is electrically connected to the integrated circuit device 1. Also, the first motor driving circuit 3 is constituted by a digital circuit. The first motor M1 is not specifically limited, and examples of the first motor M1 include a DC motor (direct-current motor), an AC motor (alternating-current motor), and a stepping motor, but, in this embodiment, a DC motor is used.

The first motor driving circuit 3 includes a first driver 31 and a first pre-driver 32 that is a first circuit different from the first driver 31. The first driver 31 is electrically connected to the first motor M1 via a plurality of first output terminals T3, and controls driving of the first motor M1 by outputting a driving signal S1 for the first motor M1 via these first output terminals T3. Also, the first driver 31 includes a constant current chopper, and performs constant current driving of the first motor M1. On the other hand, the first pre-driver 32 controls driving of the first driver 31 bases on an instruction from the logic circuit 8.

In addition, the plurality of first output terminals T3 are positioned on the plus side in the X axis direction of the first motor driving circuit block 30, and are aligned along the side 2Y1. In addition, constant potential terminals 13 and 14, regarded as a pair, connected to a constant potential, specifically a ground are disposed on the two sides in the Y axis direction of these first output terminals T3. Specifically, four first output terminals T3 are disposed to be sandwiched by the pair of constant potential terminals 13 and 14. More specifically, the constant potential terminal 13 is disposed on the plus side in the Y axis direction of the first output terminal T3 that is positioned farthest on the plus side in the Y axis direction. In addition, no other terminal is disposed between these terminals. The constant potential terminal 14 is disposed on the minus side in the Y axis direction of the first output terminal T3 that is positioned farthest on the minus side in the Y axis direction. In addition, no other terminal is disposed between these terminals.

Here, to be more accurate, "a first output terminals T3 is disposed to be sandwiched by the pair of constant potential terminals 13 and 14" means that a well formed in a circuit that is formed in the silicon substrate 2 and leads to the first output terminals T3 is disposed between an impurity diffusion region that is formed in the silicon substrate 2 and leads to the constant potential terminal 13 and an impurity diffusion region that is formed in the silicon substrate 2, and leads to the constant potential terminal 14. This applies to second output terminals T4 and third output terminals T5, which will be described later.

In addition, as shown in FIG. 2, the first driver 31 and the first pre-driver 32 are electrically connected to the constant potential terminals 13 and 14 that are different from each other. Specifically, the first driver 31 is electrically connected to the constant potential terminal 13, which is one in the pair, by an interconnect H31, and the first pre-driver 32 is electrically connected to the constant potential terminal 14, which is the other in the pair, by an interconnect H32. As a result of electrically connecting the first driver 31 and the first pre-driver 32 to the potential terminals 13 and 14 that are different from each other in this manner, it is possible to effectively keep a change in the power supply potential caused by a large current that flows in the first driver 31, from affecting operations of the first pre-driver 32. Therefore, the first pre-driver 32 can perform stable driving.

Note that, as shown in FIG. 3, also when the first driver 31 and the first pre-driver 32 are connected to the same constant potential terminal 13, a similar effect to that described above can be achieved as a result of the routing being branched from the constant potential terminal 13, in other words by providing the interconnect H31 that connects the first driver 31 and the constant potential terminal 13 and the interconnect H32 that connects the first pre-driver 32 and the constant potential terminal 13.

However, the configuration of the first motor driving circuit 3 is not specifically limited as long as driving of the first motor M1 can be controlled. The arrangement of the plurality of first output terminals T3 is not specifically limited as well, and, for example, the first output terminals T3 may be also disposed along one of the sides 2Y2, 2X1, and 2X2, other than the side 2Y1, or at least one of the first output terminals T3 does not need to be disposed between the pair of constant potential terminals 13 and 14.

The second motor driving circuit 4 is a circuit that controls driving of a second motor M2 that is electrically connected to the integrated circuit device 1. Also, the second motor driving circuit 4 is constituted by a digital circuit. The second motor M2 is not specifically limited, and examples of the second motor M2 include a DC motor, an AC motor, and a stepping motor, but, in this embodiment, a DC motor is used.

The second motor driving circuit 4 has a configuration similar to that of the first motor driving circuit 3. Specifically, the second motor driving circuit 4 includes a second driver 41 and a second pre-driver 42 that is a second circuit different from the second driver 41, as shown in FIG. 1. The second driver 41 is electrically connected to the second motor M2 via the plurality of second output terminals T4, and controls driving of the second motor M2 by outputting a driving signal S2 for the second motor M2 via these second output terminals T4. In addition, the second driver 41 includes a constant current chopper, and performs constant current driving of the second motor M2. On the other hand, the second pre-driver 42 controls driving of the second driver 41 based on an instruction from the logic circuit 8.

In addition, the plurality of second output terminals T4 are positioned in the X axis direction on the plus side of the second motor driving circuit block 40, and are aligned along the side 2Y1. In addition, constant potential terminals 15 and 16, regarded as a pair, connected to a constant potential, specifically a ground are disposed on the two sides in the Y axis direction of these second output terminals T4. Specifically, four second output terminals T4 are disposed to be sandwiched by the pair of constant potential terminals 15 and 16. More specifically, the constant potential terminal 15 is disposed on the plus side in the Y axis direction of the second output terminal T4 that is positioned farthest on the plus side in the Y axis direction. In addition, no other terminal is disposed between these terminals. The constant potential terminal 16 is disposed on the minus side in the Y axis direction of the second output terminal T4 that is positioned farthest on the minus side in the Y axis direction. In addition, no other terminal is disposed between these terminals.

In addition, as shown in FIG. 2, the second driver 41 and the second pre-driver 42 are electrically connected to the constant potential terminals 15 and 16 that are different from each other. Specifically, the second driver 41 is electrically connected to the constant potential terminal 15, which is one in the pair, by an interconnect H41, and the second pre-driver 42 is electrically connected to the constant potential terminal 16, which is the other in the pair, by an interconnect H42. As a result of electrically connecting the second driver 41 and the second pre-driver 42 to the constant potential terminals 15 and 16 that are different from each other in this manner, it is possible to effectively keep a change in the power supply potential caused by a large current that flows in the second driver 41, from affecting operations of the second pre-driver 42. Therefore, the second pre-driver 42 can perform stable driving.

Note that, as shown in FIG. 3, also when constant potential nodes of the second driver 41 and the second pre-driver 42 are connected to the same constant potential terminal 15, a similar effect to that described above can be achieved as a result of the routing being branched from the constant potential terminal 15, in other words by providing the interconnect H41 that connects the second driver 41 and the constant potential terminal 15 and the interconnect H42 that connects the second pre-driver 42 and the constant potential terminal 15.

However, the configuration of the second motor driving circuit 4 is not specifically limited as long as driving of the second motor M2 can be controlled. The arrangement of the plurality of second output terminals T4 is not specifically limited as well, and, for example, the second output terminals T4 may also be disposed along one of the sides 2Y2, 2X1, and 2X2 other than the side 2Y1, or at least one of the second output terminals T4 does not need to be disposed between the pair of constant potential terminals 15 and 16.

The third motor driving circuit 5 is a circuit that controls driving of a third motor M3 that is electrically connected to the integrated circuit device 1. Also, the third motor driving circuit 5 is constituted by a digital circuit. Note that the third motor M3 is not specifically limited, and examples of the third motor M3 include a DC motor, an AC motor, and a stepping motor, but in this embodiment, a stepping motor is used. As a result of using, as the third motor M3, a stepping motor that uses a method different from those of the first motor M1 and the second motor M2 that are DC motors in this manner, the integrated circuit device 1 that can control driving of a plurality of types of motors is achieved. Therefore, the integrated circuit device 1 that is more convenient is achieved.

As shown in FIG. 1, the third motor driving circuit 5 includes a third driver 51 and a third pre-driver 52 that is a circuit different from the third driver 51. The third driver 51 is electrically connected to the third motor M3 via the plurality of third output terminals T5, and controls driving of the third motor M3 by outputting a driving signal S3 for the third motor M3 via these third output terminals T5. On the other hand, the third pre-driver 52 controls driving of the third driver 51 based on an instruction from the logic circuit 8.

In addition, the plurality of third output terminals T5 are positioned on the minus side in the Y axis direction of the third motor driving circuit block 50, and are aligned along the side 2X2. In addition, constant potential terminals 17 and 18, regarded as a pair, connected to a constant potential, specifically a ground are disposed on the two sides in the X axis direction of these third output terminals T5. Specifically, four third output terminals T5 are disposed to be sandwiched by the pair of constant potential terminals 17 and 18. More specifically, the constant potential terminal 17 is disposed on the plus side in the X axis direction of the third output terminal T5 that is positioned farthest on the plus side in the X axis direction. In addition, no other terminal is disposed between these terminals. The constant potential terminal 18 is positioned on the minus side in the X axis direction of the third output terminal T5 that is positioned farthest on the minus side in the X axis direction. In addition, no other terminal is disposed between these terminals.

In addition, as shown in FIG. 2, the third driver 51 and the third pre-driver 52 are electrically connected to the constant potential terminals 17 and 18 that are different from each other. Specifically, the third driver 51 is electrically connected to the constant potential terminal 17, which is one in the pair, by an interconnect H51, and the third pre-driver 52 is electrically connected to the constant potential terminal 18, which is the other in the pair, by an interconnect H52. As a result of electrically connecting the third driver 51 and the third pre-driver 52 to the constant potential terminals 17 and 18 that are different from each other in this manner, it is possible to effectively keep a change in the power supply potential caused by a large current that flows in the third driver 51, from affecting operations of the third pre-driver 52. Therefore, the third pre-driver 52 can perform stable driving.

Note that, as shown in FIG. 3, also when the third driver 51 and the third pre-driver 52 are connected to the same constant potential terminal 17, a similar effect to that described above can be achieved as a result of the routing being branched from the constant potential terminal 17, in other words, by providing the interconnect H51 that connects the third driver 51 and the constant potential terminal 17 and the interconnect H52 that connects the third pre-driver 52 and the constant potential terminal 17.

However, the configuration of the third motor driving circuit 5 is not specifically limited as long as driving of the third motor M3 can be controlled. The arrangement of the plurality of third output terminals T5 is not specifically limited as well, and, for example, the third output terminals T5 may also be disposed along one of the other sides 2Y1, 2Y2, and 2X1 other than the side 2X2, or at least one of the third output terminals T5 does not need to be disposed between the pair of constant potential terminals 17 and 18.

As shown in FIG. 1, the constant current generation circuit 6 is a circuit that is electrically connected to a load R via terminals T6, and can set a current that flows in the load R to be constant. The load R is not specifically limited, and examples of the load R include various light sources, a resistor, a coil, and an oscillator. Note that, in embodiments to be described later, an LED light source and laser light are mentioned as examples of the load R.

Such the constant current generation circuit 6 is constituted by, for example, an analog circuit 61 that includes a comparator (not illustrated) and a digital circuit 62 that includes an H-bridge circuit (not illustrated). Specifically, the comparator compares a voltage that occurs in a resistor for current detection connected on the GND side of the H-bridge with a reference voltage generated by the reference voltage circuit 11, and ON/OFF control of a current from the H-bridge to the load R is performed based on the comparison result. That is to say, a PWM (Pulse Width Modulation) control is performed. Accordingly, the circuit configuration of the constant current generation circuit 6 becomes relatively simple. Note that the constant current generation circuit 6 is not specifically limited as long as a current that flows in the load R can be made constant.

The configurations of the circuits 3 to 12 have been described above. Next, the arrangement of the circuits 3 to 12 on the silicon substrate 2 will be described. Note that the circuits 3 to 12 are arranged to avoid a singulation region set at the outer edge of the silicon substrate 2.

As shown in FIG. 1, the constant current generation circuit block 60, the first motor driving circuit block 30, the second motor driving circuit block 40, and the third motor driving circuit block 50 are arranged along the edge on the plus side in the X axis direction of the silicon substrate 2. Specifically, the constant current generation circuit block 60, the first motor driving circuit block 30, the second motor driving circuit block 40, and the third motor driving circuit block 50 each have a long shape in which the X axis direction is a longitudinal direction, are aligned in the Y axis direction from the plus side to the minus side in the stated order, and are arranged along the side 2Y1. According to such an arrangement, the first motor driving circuit block 30, the second motor driving circuit block 40, and the third motor driving circuit block 50 can be arranged collectively at an edge of the silicon substrate 2, specifically the lower right corner in FIG. 1.

In addition, the DC/DC converter circuit block 70 is positioned on the minus side in the X axis direction of the constant current generation circuit block 60, and is disposed along the side 2X1. In addition, the logic circuit block 80 is positioned on the minus side in the X axis direction of the first motor driving circuit block 30, the second motor driving circuit block 40, and the third motor driving circuit block 50, and on the minus side in the Y axis direction of the DC/DC converter circuit block 70, and is disposed along the side 2X2. In addition, the interface circuit block 90 is positioned on the minus side in the X axis direction of the logic circuit block 80, and is disposed along the side 2Y2. In addition, the reset circuit block 100 and the reference voltage circuit block 110 are positioned on the minus side in the X axis direction of the logic circuit block 80, and on the minus side in the Y axis direction of the interface circuit block 90, and are disposed at the lower left corner in FIG. 1. In addition, the oscillation circuit block 120 is positioned on the minus side in the X axis direction of the DC/DC converter circuit block 70, and on the plus side in the Y axis direction of the interface circuit block 90, and is disposed at the upper left corner in FIG. 1.

Here, the first motor driving circuit 3, the second motor driving circuit 4, and the third motor driving circuit 5 are circuits that respectively control driving of the first motor M1, the second motor M2, and the third motor M3. Therefore, a surge current that occurs in the first motor M1, the second motor M2, and the third motor M3 is applied to the first motor driving circuit 3, the second motor driving circuit 4, and the third motor driving circuit 5 via the first output terminals T3, the second output terminals T4, and the third output terminals T5, and noise caused by the surge current occurs. Accordingly, the first motor driving circuit 3, the second motor driving circuit 4, and the third motor driving circuit 5 are sources of noise. There is a risk that such noise is transmitted to other circuits via the silicon substrate 2, and adversely affects the circuits. Particularly, the constant current generation circuit 6, the DC/DC converter circuit 7, the reset circuit 10, and the reference voltage circuit 11 that include an analog circuit that is likely to be at least partially affected by noise are likely to be affected by noise, and this may cause these circuits to malfunction.

Therefore, as described above, in the integrated circuit device 1, the blocks 30, 40, and 50 in which the first motor driving circuit 3, the second motor driving circuit 4, and the third motor driving circuit 5 are respectively disposed are collectively arranged in an end portion of the silicon substrate 2, specifically, at the lower right corner in FIG. 1. Accordingly, it is possible to separate the first motor driving circuit 3, the second motor driving circuit 4, and the third motor driving circuit 5 from other circuits, specifically, the constant current generation circuit 6, the DC/DC converter circuit 7, the reset circuit 10, and the reference voltage circuit 11 that are likely to be affected by noise, as much as possible. Therefore, noise that occurs in the first motor driving circuit 3, the second motor driving circuit 4, or the third motor driving circuit 5 is unlikely to be transmitted to the constant current generation circuit 6, the DC/DC converter circuit 7, the reset circuit 10, and the reference voltage circuit 11, and it is possible to effectively keep these circuits from malfunctioning.

Specifically, according to this embodiment, the constant current generation circuit block 60 is positioned on the plus side in the Y axis direction of the first motor driving circuit block 30. More specifically, when seen in a planar view from the Z axis direction, the constant current generation circuit block 60 is disposed at a position deviating from between the first motor driving circuit block 30 and the second motor driving circuit block 40, and is disposed at a position deviating from between the first motor driving circuit block 30 and the third motor driving circuit block 50. According to such an arrangement, noise that occurs in the first motor driving circuit 3, the second motor driving circuit 4, or the third motor driving circuit 5 is unlikely to be transmitted to the constant current generation circuit 6, and the constant current generation circuit 6 is kept from malfunctioning. Therefore, stable driving of the constant current generation circuit 6 is realized.

In addition, the DC/DC converter circuit 7 is positioned on the minus side in the X axis direction of the constant current generation circuit block 60. Specifically, when seen in a planar view from the Z axis direction, the DC/DC converter circuit 7 is disposed at a position deviating from between the first motor driving circuit block 30 and the second motor driving circuit block 40, and is disposed at a position deviating from between the first motor driving circuit block 30 and the third motor driving circuit block 50. According to such an arrangement, noise that occurs in the first motor driving circuit 3, the second motor driving circuit 4, or the third motor driving circuit 5 is unlikely to be transmitted to the DC/DC converter circuit 7, and the DC/DC converter circuit 7 is kept from malfunctioning.

In addition, it can also be said that the constant current generation circuit block 60 is positioned between the DC/DC converter circuit block 70 and the first motor driving circuit block 30. Accordingly, it is possible to further separate the first motor driving circuit block 30 and the second motor driving circuit block 40 from the DC/DC converter circuit 7. Therefore, the DC/DC converter circuit 7 is unlikely to be contaminated with noise, and is kept from malfunctioning. Note that "the constant current generation circuit block 60 is positioned between" means that, for example, at least one line L that is in contact with the outer edge of the DC/DC converter circuit block 70 and the outer edge of the first motor driving circuit block 30 overlaps the constant current generation circuit block 60.

In particular, the logic circuit 8 is disposed between the DC/DC converter circuit 7 and the first motor driving circuit 3, the second motor driving circuit 4, and the third motor driving circuit 5. Accordingly, it is possible to further separate the DC/DC converter circuit 7 from the first motor driving circuit 3, the second motor driving circuit 4, and the third motor driving circuit 5, and the DC/DC converter circuit 7 is unlikely to be affected by noise. Note that the logic circuit 8, which is a digital circuit, is unlikely to be affected by noise, and thus there is no risk that the logic circuit 8 malfunctions even when disposed near the first motor driving circuit 3, the second motor driving circuit 4, and the third motor driving circuit 5.

In addition, the reset circuit 10 and the reference voltage circuit 11 are arranged at the lower left corner of the silicon substrate 2 in FIG. 1. Specifically, when seen in a planar view from the Z axis direction, the reset circuit 10 and the reference voltage circuit 11 are disposed at a position deviating from between the first motor driving circuit block 30 and the second motor driving circuit block 40, and are disposed at a position deviating from between the first motor driving circuit block 30 and the third motor driving circuit block 50. According to such an arrangement, noise that occurs in the first motor driving circuit 3, the second motor driving circuit 4, or the third motor driving circuit 5 is unlikely to be transmitted to the reset circuit 10 and the reference voltage circuit 11, and the reset circuit 10 and the reference voltage circuit 11 are kept from malfunctioning.

Particularly, the logic circuit 8 is disposed between a group of the reset circuit 10 and the reference voltage circuit 11 and a group of the first motor driving circuit 3, the second motor driving circuit 4, and the third motor driving circuit 5. Accordingly, it is possible to further separate the reset circuit 10 and the reference voltage circuit 11 from the first motor driving circuit 3, the second motor driving circuit 4, and the third motor driving circuit 5, and the reset circuit 10 and the reference voltage circuit 11 are unlikely to be affected by the above-described noise.

In addition, as a result of the first output terminals T3 and the second output terminals T4, into which a surge current invades, being disposed near the first motor driving circuit block 30 and the second motor driving circuit block 40 along the side 2Y1, and the third output terminals T5, into which a surge current invades similarly, being disposed near the third motor driving circuit block 50 along the side 2X2, it is possible to further separate the first output terminals T3, the second output terminals T4, and the third output terminals T5 from the constant current generation circuit 6, the DC/DC converter circuit 7, the reset circuit 10, and the reference voltage circuit 11. Therefore, the constant current generation circuit 6, the DC/DC converter circuit 7, the reset circuit 10, and the reference voltage circuit 11 are unlikely to be affected by noise.

In addition, as described above, the constant current generation circuit 6 includes the analog circuit 61 and the digital circuit 62, the analog circuit 61 being disposed on the minus side in the X axis direction, and the digital circuit 62 being disposed on the plus side in the X axis direction. Accordingly, it is possible to further separate the analog circuit 61 from the first output terminals T3 and the second output terminals T4. Therefore, the constant current generation circuit 6 is unlikely to be affected by the above-described noise.

In addition, as described above, the first output terminals T3 are sandwiched by the pair of constant potential terminals 13 and 14. Therefore, a surge current that has intruded from each of the first output terminals T3 is easily removed via the constant potential terminal 13 or 14 before entering another circuit. In addition, the second output terminals T4 are sandwiched by the pair of constant potential terminals 15 and 16. Therefore, a surge current that has intruded from each of the second output terminals T4 is easily removed via the constant potential terminal 15 or 16 before entering another circuit. In addition, the third output terminals T5 are sandwiched by the pair of constant potential terminals 17 and 18. Therefore, a surge current that has intruded from each of the third output terminals T5 is easily removed via the constant potential terminal 17 or 18 before entering another circuit. Accordingly, the constant potential terminals 13 to 18 function as shields. Therefore, the constant current generation circuit 6, the DC/DC converter circuit 7, the reset circuit 10, and the reference voltage circuit 11 are unlikely to be affected by noise.

The integrated circuit device 1 that includes the motor driving circuit 1M has been described above. As described above, such the motor driving circuit 1M includes the first motor driving circuit block 30 in which the first motor driving circuit 3 that controls driving of the first motor M1 is disposed, the second motor driving circuit block 40 in which the second motor driving circuit 4 that controls driving of the second motor M2 is disposed, and the constant current generation circuit block 60 in which the constant current generation circuit 6 that generates a constant current is disposed. The constant current generation circuit block 60 is disposed at a position deviating from between the first motor driving circuit block 30 and the second motor driving circuit block 40, specifically, the constant current generation circuit block 60 is disposed at a deviated position when seen in a planar view from in the Z axis direction. Accordingly, it is possible to separate the constant current generation circuit 6 from the first motor driving circuit 3 and the second motor driving circuit 4, which are sources of noise, as much as possible. Therefore, the constant current generation circuit 6 is unlikely to be contaminated with noise, and it is possible to effectively keep the constant current generation circuit 6 from malfunctioning.

In addition, as described above, the first motor driving circuit 3 includes the first output terminals T3 that are electrically connected to the first motor M1, and output the driving signal S1 for the first motor M1. In addition, the constant potential terminals 13 and 14 connected to the constant potential are disposed on the two sides of the first output terminals T3. Accordingly, the constant potential terminals 13 and 14 function as shields, and the constant current generation circuit 6 is unlikely to be contaminated with noise.

In addition, as described above, the first motor driving circuit 3 includes the first driver 31 that is a first driving circuit that controls driving of the first motor M1, and the first pre-driver 32 that is a first circuit different from the first driver 31. The first driver 31 and the first pre-driver 32 are connected to the constant potential terminals 13 and 14 that are different from each other. Accordingly, it is possible to effectively keep a large current that flows in the first driver 31 from entering the first pre-driver 32. Therefore, the first pre-driver 32 can perform stable driving.

In addition, as described above, the second motor driving circuit 4 is electrically connected to the second motor M2, and includes the second output terminals T4 that output the driving signal S2 for the second motor M2. In addition, the constant potential terminals 15 and 16 connected to the constant potential are disposed on the two sides of the second output terminals T4. Accordingly, the constant potential terminals 15 and 16 function as shields, and the constant current generation circuit 6 is unlikely to be contaminated with noise.

In addition, as described above, the second motor driving circuit 4 includes the second driver 41 that is a second driving circuit that controls driving of the second motor M2, and the second pre-driver 42 that is a second circuit different from the second driver 41. In addition, the second driver 41 and the second pre-driver 42 are connected to the constant potential terminals 15 and 16 that are different from each other. Accordingly, it is possible to effectively keep a large current that flows in the second driver 41 from entering the second pre-driver 42. Therefore, the second pre-driver 42 can perform stable driving.

In addition, as described above, the motor driving circuit 1M includes the DC/DC converter circuit block 70 that is an analog circuit block in which the DC/DC converter circuit 7 that is an analog circuit is disposed. The constant current generation circuit block 60 is disposed between the DC/DC converter circuit block 70 and at least one of the first motor driving circuit block 30 and the second motor driving circuit block 40. Accordingly, it is possible to further separate the first motor driving circuit block 30 and the second motor driving circuit block 40 from the DC/DC converter circuit 7, and the DC/DC converter circuit 7 is unlikely to be contaminated with noise. Therefore, the DC/DC converter circuit 7 can be driven in a stable manner.

In addition, as described above, the constant current generation circuit 6 includes an H-bridge circuit. This simplifies the configuration of the constant current generation circuit 6.

In addition, as described above, the integrated circuit device 1 includes the motor driving circuit 1M. Therefore, the integrated circuit device 1 can enjoy the above-described effects of the motor driving circuit 1M.
Therefore, the integrated circuit device 1 that has a high reliability is achieved.

Second Embodiment

Figure 4:
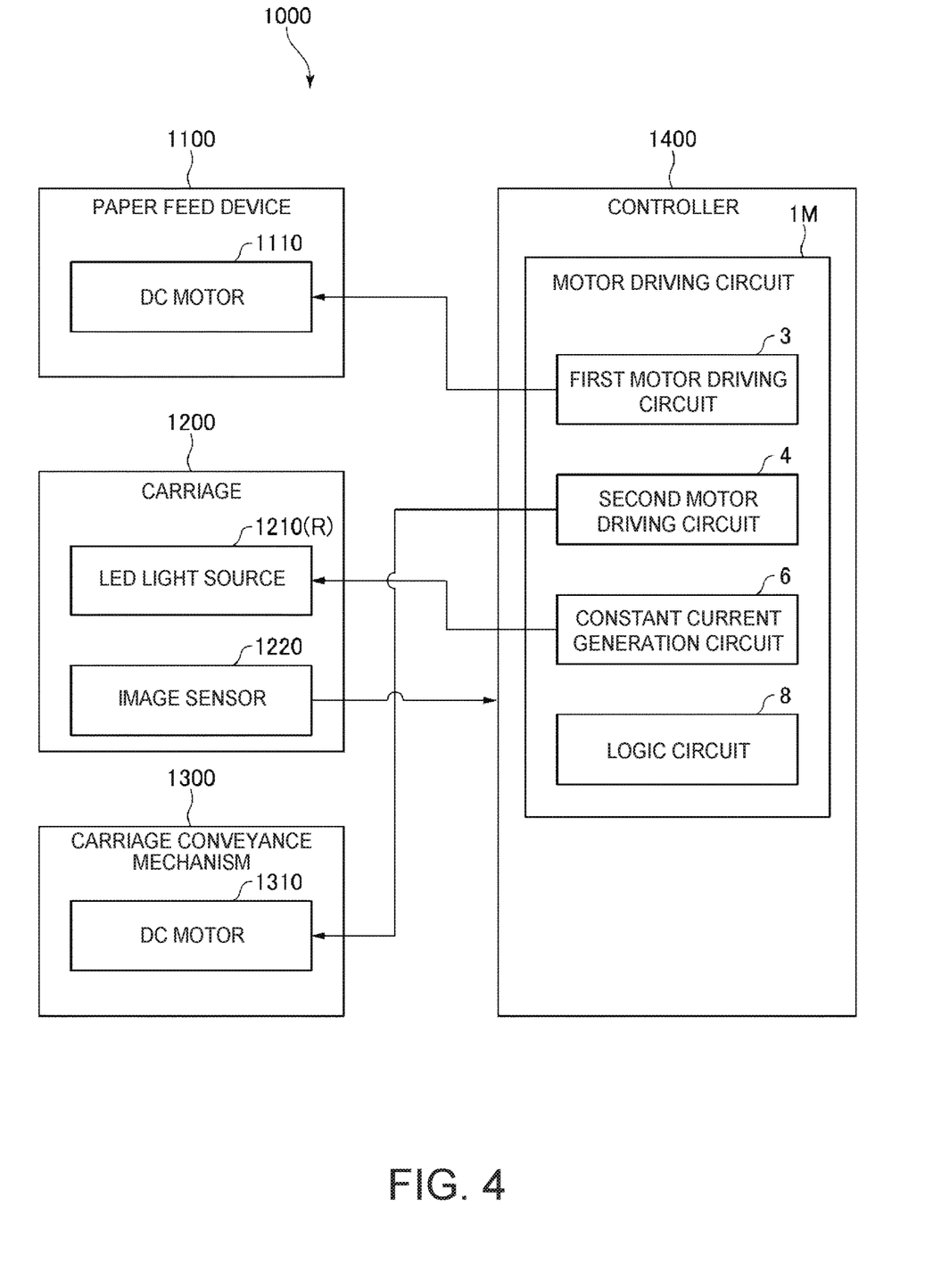
FIG. 4 is a block diagram showing an image reading device according to a second embodiment.

FIG. 4 is a block diagram showing an image reading device according to a second embodiment.

As shown in FIG. 4, an image reading device 1000 that is an electronic apparatus is a flatbed image reading device, and includes a paper feed device 1100, a carriage 1200, a carriage conveyance mechanism 1300, and a controller 1400 that performs various types of processing for reading an image.

The paper feed device 1100 includes a paper feed tray (not illustrated), a conveyance roller (not illustrated) for conveying a document placed on the paper feed tray to a document stage, and a DC motor 1110 for driving the conveyance roller. As a result of driving the DC motor 1110, and rotationally driving the conveyance roller, the document placed on the paper feed tray is conveyed to the document stage using the conveyance roller.

The carriage 1200 is disposed below the document stage. Also, an LED light source 1210 that illuminates the document on the document stage, and an image sensor 1220 that reads the document on the document stage are mounted in the carriage 1200. In addition, the carriage conveyance mechanism 1300 includes a DC motor 1310, and reciprocally moves the carriage 1200 in the sub-scanning direction of the document stage by driving the DC motor 1310. As a result of the paper feed device 1100 moving the document on the document stage in the main scanning direction, and at the same time, the carriage conveyance mechanism 1300 moving the carriage 1200 in the sub-scanning direction, while the LED light source 1210 illuminates the document on the document stage, the image sensor 1220 can read the image of the entire document. The image read by the image sensor 1220 is transmitted to the controller 1400, and is stored.

The controller 1400 includes a motor driving circuit 1M. In addition, the motor driving circuit 1M includes a first motor driving circuit 3 that controls driving of the DC motor 1110 that is a first motor M1, a second motor driving circuit 4 that controls driving of the DC motor 1310 that is a second motor M2, a constant current generation circuit 6 that supplies a constant current to the LED light source 1210 that is a load R, and a logic circuit 8 that controls these circuits 3, 4, and 6. Such the motor driving circuit 1M is not specifically limited, and, for example, the motor driving circuit 1M that has the above-described configuration according to the first embodiment may also be used. In this case, a portion or the entirety of the arrangement of the circuit 3 to 12 and the arrangement of the terminals 13 to 18 and T3 to T6 may be similar to those in the above first embodiment. This makes it possible to exert similar effects to those described in the first embodiment. In addition, the motor driving circuit 1M that has a configuration different from that in the first embodiment may also be used.

As described above, the image reading device 1000 that is an electronic apparatus includes the motor driving circuit 1M, the DC motor 1110 that is the first motor M1, the DC motor 1310 that is the second motor M2, and the LED light source 1210 that is the load R that is supplied with a constant current generated by the constant current generation circuit 6. Therefore, the image reading device 1000 that can enjoy the effects of the motor driving circuit 1M, and has a high reliability is achieved.

Third Embodiment

Figure 5:
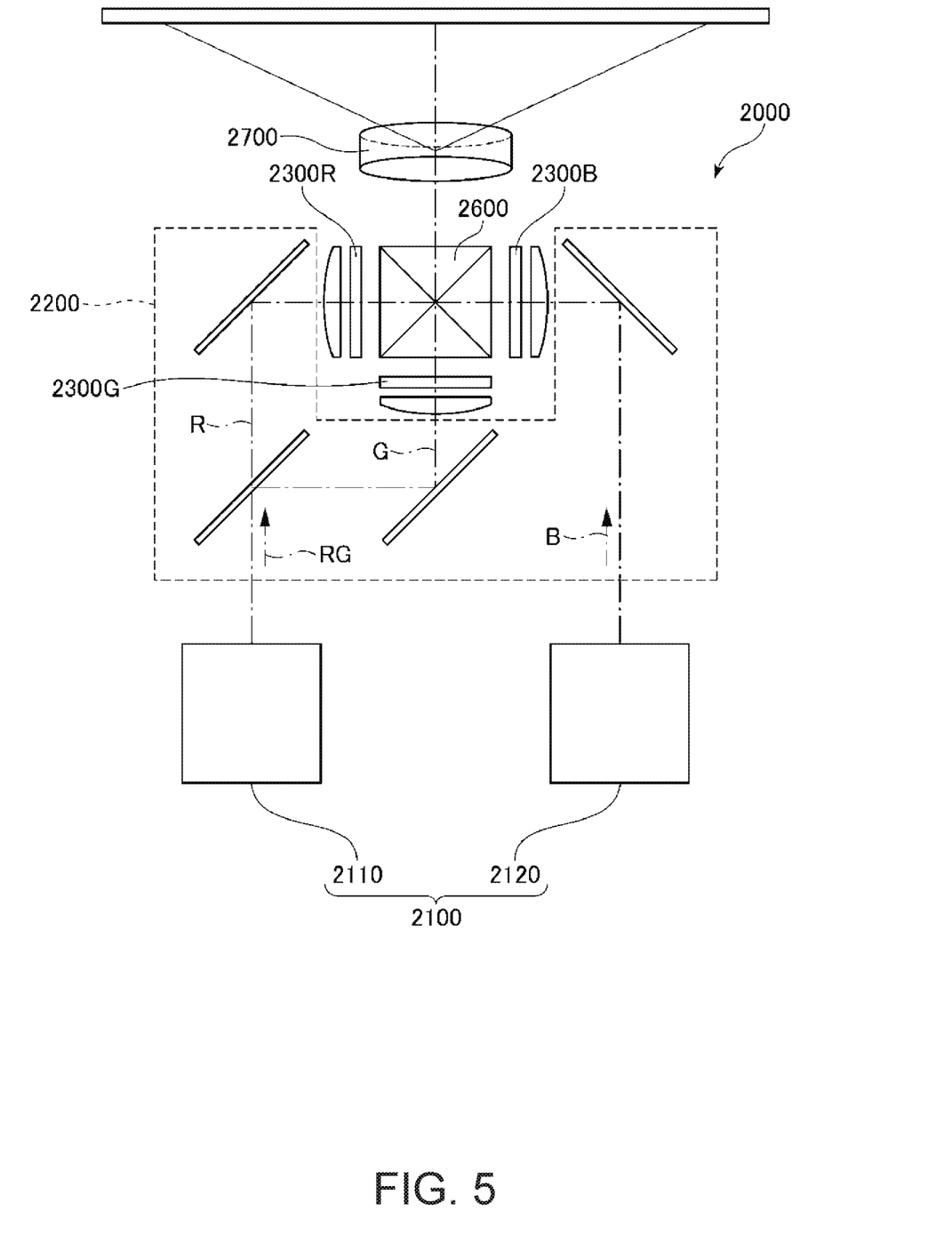
FIG. 5 is a diagram showing an overall configuration of a projector according to a third embodiment.
Figure 6:
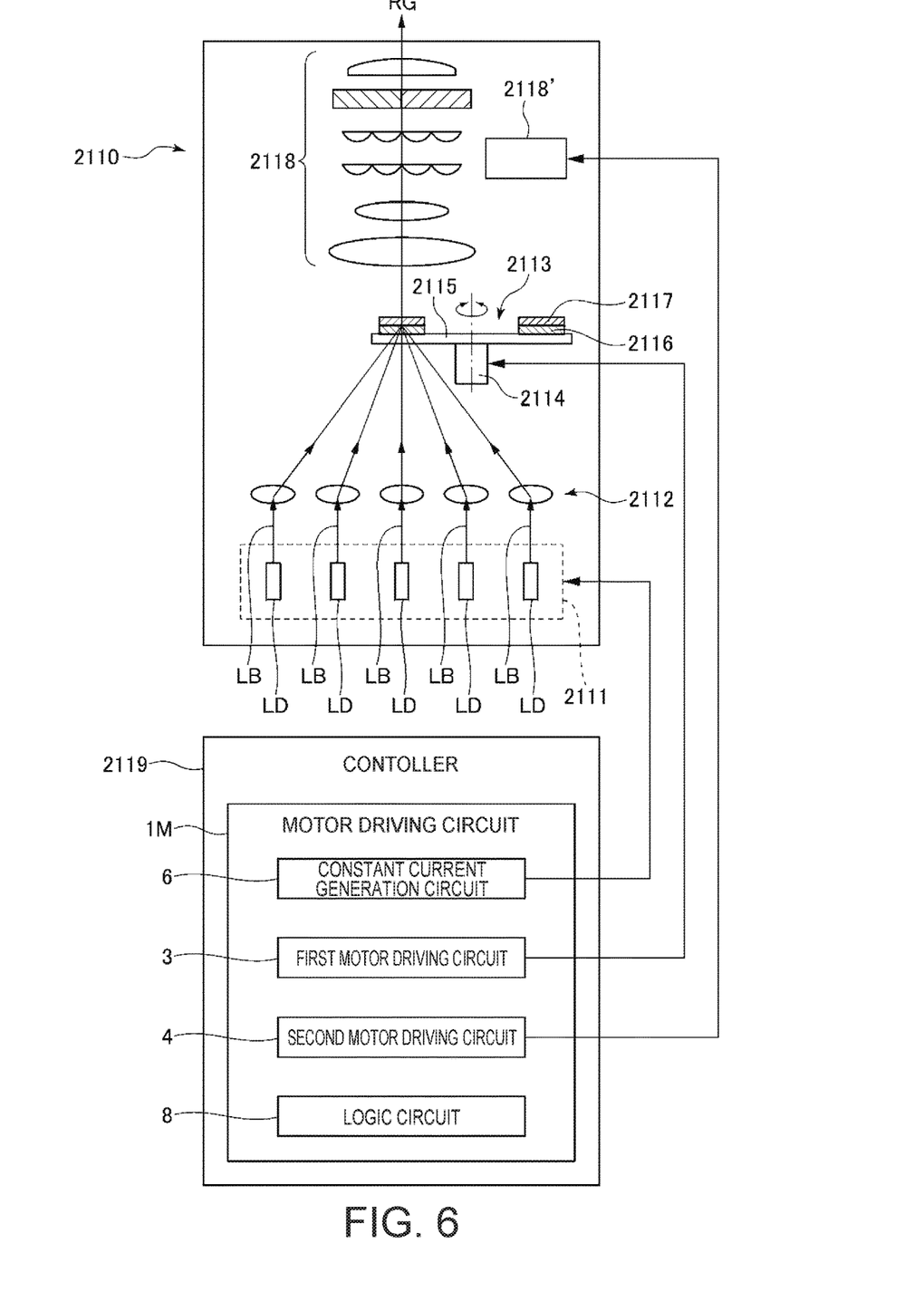
FIG. 6 is a diagram showing an overall configuration of an illumination device.

FIG. 5 is a diagram showing an overall configuration of a projector according to a third embodiment. FIG. 6 is a diagram showing an overall configuration of an illumination device.

As shown in FIG. 5, a projector 2000 that is an electronic apparatus includes an illumination device 2100, a color separation light-guiding optical system 2200, the liquid crystal light modulating device 2300R, a liquid crystal light modulating device 2300G, a liquid crystal light modulating device 2300B, a cross dichroic prism 2600, and a projection optical system 2700. In addition, the illumination device 2100 includes a first illumination device 2110 and a second illumination device 2120. The first illumination device 2110 emits illumination light RG that includes red light and green light toward the color separation light-guiding optical system 2200. The second illumination device 2120 emits blue light B toward the color separation light-guiding optical system 2200.

As shown in FIG. 6, the first illumination device 2110 includes a first light source device 2111, a light shaping optical system 2112, a rotating fluorescent plate 2113, an optical system 2118 that includes a plurality of lenses and polarization elements, an AF motor 2118' for autofocus of the optical system 2118, and a controller 2119. In addition, the first light source device 2111 includes a plurality of semiconductor lasers LD that emit blue laser light LB that is excitation light. The laser light LB emitted from the semiconductor lasers LD is incident onto the rotating fluorescent plate 2113 via the light shaping optical system 2112. The rotating fluorescent plate 2113 includes a base material 2115, a laminate composed of a dichroic layer 2116 and a fluorescent body layer 2117 that is disposed on the base material 2115, and a DC motor 2114 for rotating the base material 2115. When the laser light LB is incident onto the fluorescent body layer 2117, the illumination light RG is emitted from the fluorescent body layer 2117.

The controller 2119 includes a motor driving circuit 1M. In addition, the motor driving circuit 1M includes a first motor driving circuit 3 that controls driving of the DC motor 2114 that is a first motor M1, a second motor driving circuit 4 that controls driving of the AF motor 2118' that is a second motor M2, a constant current generation circuit 6 that supplies a constant current to the semiconductor lasers LD that are loads R, and a logic circuit 8 that controls these circuits 3, 4, and 6. Such the motor driving circuit 1M is not specifically limited, and, for example, the motor driving circuit 1M that has the above-described configuration according to the first embodiment may also be used. In this case, a portion or the entirety of the arrangement of the circuit 3 to 12 and the arrangement of the terminals 13 to 18 and T3 to T6 may be similar to those in the above first embodiment. This makes it possible to exert similar effects to those described in the first embodiment. In addition, the motor driving circuit 1M that has a configuration different from that in the first embodiment may also be used.

As described above, the projector 2000 that is an electronic apparatus includes the motor driving circuit 1M, the DC motor 2114 that is the first motor M1, the AF motor 2118' that is the second motor M2, and the semiconductor lasers LD that are the loads R that are supplied with a constant current generated by the constant current generation circuit 6. Therefore, the projector 2000 that can enjoy the effects of the motor driving circuit 1M, and has a high reliability is achieved.

Note that the electronic apparatus including the motor driving circuit 1M can be applied to a personal computer, a digital still camera, a tablet terminal, a clock, a smart watch, a television, smart glasses, a wearable terminal such as an HMD (head mounted display), a video camera, a video tape recorder, a car navigation device, a drive recorder, an electronic game machine, a toy, a word processor, a work station, a videophone, a surveillance television monitor, electronic binoculars, a POS terminal, a medical apparatus, a fish detector, and various measurement apparatuses, for example, in addition to the above-described image reading device 1000 and projector 2000.

The motor driving circuit, the integrated circuit device, and the electronic apparatus according to the present disclosure have been described above based on the illustrated embodiments, but the present disclosure is not limited thereto, and the configuration of each constituent element can be replaced with any configuration that has a similar function. In addition, any other configuration may be added to the present disclosure. In addition, the above embodiments may be combined as appropriate.

In addition, in the above embodiments, the motor driving circuit 1M includes the first motor driving circuit 3, the second motor driving circuit 4, the third motor driving circuit 5, the constant current generation circuit 6, the DC/DC converter circuit 7, the logic circuit 8, the interface circuit 9, the reset circuit 10, the reference voltage circuit 11, and the oscillation circuit 12, but as long as the first motor driving circuit 3, the second motor driving circuit 4, and the constant current generation circuit 6 are provided, at least one of the other circuits may be omitted, or at least one other circuit may be added. In addition, as long as the constant current generation circuit block 60 is disposed at a position deviating from between the first motor driving circuit block 30 and the second motor driving circuit block 40, the arrangement of the blocks 30 to 120 is not specifically limited.

What is claimed is:
1. A motor driving circuit comprising:
a first motor driving circuit that controls driving of a first motor;
a second motor driving circuit that controls driving of a second motor; and
a constant current generation circuit that generates a constant current and outputs the constant current to a load,
wherein the constant current generation circuit is disposed at a position deviating from between the first motor driving circuit and the second motor driving circuit.
2. An integrated circuit device comprising the motor driving circuit according to claim 1.
3. An electronic apparatus comprising:
the motor driving circuit according to claim 1:
the first motor;
the second motor; and
the load that is supplied with the constant current generated by the constant current generation circuit.
4. A motor driving circuit comprising:
a first motor driving circuit that controls driving of a first motor;
a second motor driving circuit that controls driving of a second motor; and
a constant current generation circuit that generates a constant current and outputs the constant current to a load,
wherein the constant current generation circuit is disposed at a position deviating from between the first motor driving circuit and the second motor driving circuit,
the first motor driving circuit includes a first output terminal that is electrically connected to the first motor, and outputs a driving signal for the first motor, and
constant potential terminals connected to a constant potential are disposed on two sides of the first output terminal.
5. The motor driving circuit according to claim 4,
wherein the first motor driving circuit includes a first driving circuit that controls driving of the first motor, and a first circuit that is different from the first driving circuit, and
the first driving circuit and the first circuit are connected to the constant potential terminals that are different from each other.

6. A motor driving circuit comprising:
a first motor driving circuit that controls driving of a first motor;
a second motor driving circuit that controls driving of a second motor; and
a constant current generation circuit that generates a constant current and outputs the constant current to a load,
wherein the constant current generation circuit is disposed at a position deviating from between the first motor driving circuit and the second motor driving circuit,
the second motor driving circuit includes a second output terminal that is electrically connected to the second motor, and outputs a driving signal for the second motor, and
constant potential terminals connected to a constant potential are disposed on two sides of the second output terminal.

7. The motor driving circuit according to claim 6,
wherein the second motor driving circuit includes a second driving circuit that controls driving of the second motor, and a second circuit that is different from the second driving circuit, and the second driving circuit and the second circuit are connected to the constant potential terminals that are different from each other.

8. A motor driving circuit comprising:
a first motor driving circuit that controls driving of a first motor;
a second motor driving circuit that controls driving of a second motor;
a constant current generation circuit that generates a constant current and outputs the constant current to a load; and
an analog circuit,
wherein the constant current generation circuit is disposed at a position deviating from between the first motor driving circuit and the second motor driving circuit, and
the constant current generation circuit is disposed between the analog circuit and at least one of the first motor driving circuit and the second motor driving circuit.

* * * * *